United States Patent [19]
Whitmore

[11] Patent Number: 4,606,228
[45] Date of Patent: Aug. 19, 1986

[54] DIAPHRAGM FOR TRANSDUCER MEASURING LOW PRESSURE DIFFERENTIALS

[75] Inventor: Raymond A. Whitmore, Llano, Calif.

[73] Assignee: General Signal Corporation, Stamford, Conn.

[21] Appl. No.: 689,414

[22] Filed: Jan. 7, 1985

[51] Int. Cl.$^4$ ............................................. G01L 9/12
[52] U.S. Cl. ...................................... 73/718; 73/724; 92/103 M
[58] Field of Search ................ 73/724, 715, 716, 723, 73/717–722, 725–728; 92/103 M, 103 SD, 103 F, 103 R

[56] References Cited

U.S. PATENT DOCUMENTS

| | | | |
|---|---|---|---|
| 56,694 | 7/1866 | Blake | 73/715 |
| 2,241,056 | 5/1941 | Chilton | 92/103 M |
| 2,747,615 | 5/1956 | Tate | 92/103 M |
| 4,056,009 | 11/1977 | Sonderegger et al. | 73/715 |

Primary Examiner—Donald O. Woodiel
Attorney, Agent, or Firm—William G. Miller, Jr.; Harold Huberfeld

[57] ABSTRACT

A diaphragm for pressure transducers which will be suitable for measuring small differentials is constructed by perforating, either partially or completely, the diaphragm material. The resulting diaphragm will require very small pressure differentials to obtain full scale deflection as compared with an unperforated diaphragm. The ideal configuration for the perforations is a series of convoluted slots etched completely through the diaphragm material from an inner radius, which may define one plate of a capacitive type transducer, to an outer radius near the periphery of the diaphragm. When the diaphragm is etched all the way through, it is covered with a thin plastic film, which may be cemented to the diaphragm or just sealed to it at its edges.

4 Claims, 4 Drawing Figures

4,606,228

DIAPHRAGM FOR TRANSDUCER MEASURING LOW PRESSURE DIFFERENTIALS

BACKGROUND OF THE INVENTION

This invention relates to differential pressure transducers and more particularly to diaphragm structures for differential pressure transducers to make possible the measurement of very low pressure differentials.

In energy management control systems such as those utilized to control the conditions in multi-story buildings, it is frequently necessary to make pressure difference measurements between indoor and outdoor air, between indoor and duct air, and between the air on various floors. All of these measurements are for the purpose of knowing where the air is moving, or trying to move. There may, for example, be openings which will allow air to move between floors of a multi-story building so as to cause much of the warm air to move to the upper floors. With proper measurement to detect this movement a computer may be used to calculate the action necessary from an associated control system to pump the air back to the lower floors. Other uses for pressure and pressure differential measurements include the measurement of air velocity in heating and cooling air ducts, where the pressure transducer is connected to a Pitot Tube.

The measurements mentioned above all involve transducers for measuring low pressure differentials (such as 1" to 10" of water, full scale). Such transducers must produce the standard 4-20 milliamp measurement signal and cost less than the typical low pressure units. The typical units generally have 4 or 5 inch diaphragms; and, because of those large diaphragms may be sensitive to the effects of gravity when in certain positions. Thus, the standard units for this service may sometimes give readings as high as full-scale when the differential is actually zero, if the transducer is positioned so that gravity can operate to deflect the diaphragm. In addition, the pressure housings associated with large diaphragms are expensive.

It is an object of the present invention to provide a small, light and, therefore, gravity insensitive and inexpensive diaphragm structure for pressure transducers, particularly of the capacitance type, for the measurement of low pressure differentials.

SUMMARY OF THE INVENTION

A diaphragm for pressure transducers which will be suitable for measuring small differentials can be constructed in accordance with this invention by perforating, either partially or completely, the diaphragm material. The resulting diaphragm will require very small pressure differentials to obtain full scale deflection as compared with an unperforated diaphragm. The ideal configuration for the perforations is a series of convoluted slots etched completely through the diaphragm material from an inner radius, which may define one plate of a capacitive type transducer, to an outer radius near the periphery of the diaphragm. When the diaphragm is etched all the way through, it is covered with a thin plastic film, which may be cemented to the diaphragm or just sealed to it at its edges.

DESCRIPTION OF THE PREFERRED EMBODIMENTS

Figure 1:
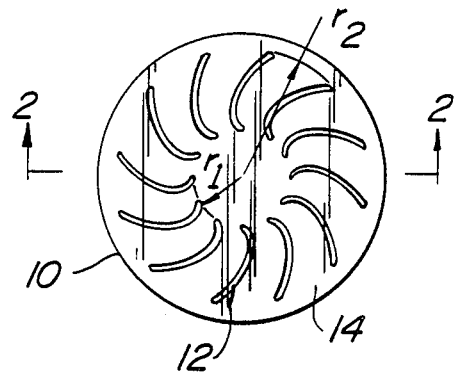
FIG. 1 is a plan view generally representative of one form of the novel diaphragm of this invention, as seen through a transparent overlay of plastic sheet material.

In FIG. 1 there is shown a representation of a plan view of one form of the novel diaphragm 10 of this invention. This diaphragm may be approximately 1 inch in diameter and 5 mils thick, for example. It must be made of resilient spring material, such as a Cu-Ni-Sn spinodal alloy produced by a powder metallurgy process or stainless steel, and must have perforations to reduce its modulus of resilience below that of a similar diaphragm of the same thickness without the perforations. In this description the word perforation shall be taken to mean either a perforation completely through the diaphragm or part way through. In FIG. 1 the perforations are shown to be in the form of slots. While, as indicated, these slots need not penetrate completely through the diaphragm material, it is preferable that they do penetrate. Also, although the perforations may take any of a number of shapes, it is preferred that they be in the shape of convoluted slots stretching from an inner radius $r_1$, defining a central portion, to an outer radius $r_2$, slightly less than the outer radius of the diaphragm itself, as shown in FIG. 1.

Since the slots in the diaphragm of FIG. 1 will be a source of air leakage across the diaphragm, particularly when they are deep enough to completely penetrate the diaphragm material, the diaphragm will have to be overlayed with a sealing cover. This cover may be of a flexible plastic material 14 and should be applied as a thin slack sheet over the diaphragm and be of sufficient strength s that it will not extrude into the slots or bunch in the slots when a differential pressure is applied to the diaphragm.

The area within the inner radius $r_1$ may be utilized as one plate of a capacitor formed as part of a capacitive type pressure transducer with the deflection of that part with relation to a fixed plate changing the spacing between the plates and hence the transducer's capacity as an indication of the pressure differential being measured.

With the slots forming convolutes, the part of the diaphragm within the inner radius will tend to rotate as the diaphragm is deflected. Pressure tranducers which utilizes diaphragms such as these can, therefore, be used to measure pressure differential by methods other than the capacitive method, such as by using a light transmitting and receiving means to detect the movement of radial indicia on the inner part of the diaphragm.

Figure 2:
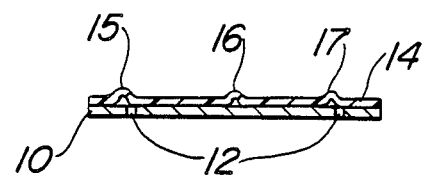
FIG. 2 is a cross section of the diaphragm of FIG. 1 along the axis 2—2.

In FIG. 2, the thin diaphragm 10 is shown in cross section with the slots 12 being sealed off by the slack plastic sheet material 14, shown as having wrinkles 15, 16, and 17, which accommodate deflection of the diaphragm 10 without providing any significant resistance to that deflection.

Figure 3:
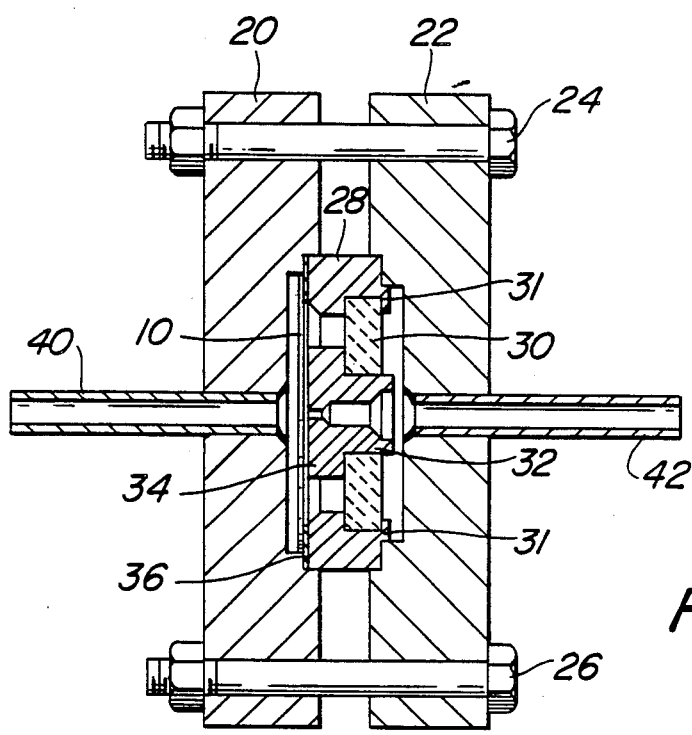
FIG. 3 is a sectional view of a differential pressure transducer assembly which can be used to mount the novel diaphragm of FIG. 1 for differential pressure measurements.

In FIG. 3 there is shown a transducer assembly for measuring pressure differentials using the diaphragm of FIG. 1. This assembly includes end plates 20 and 22, which may be bolted together by the bolts 24 and 26. The end plates each have recessed center portions for receiving the other elements of the assembly. These other elements include an outer ring 28, which may be of stainless steel, and is used to keep the diaphragm in a precise position while preventing unwanted distortion of the diaphragm. A ceramic washer 30 is held in a recess of the ring 28 by bent over tabs 31, and is provided to give insulating support for the fixed plate electrode 32, which has a central hole for communication from one pressure source to the space between the fixed electrode surface 34 and the diaphragm 10. The electrode 32 has its electrode surface 34 facing the diaphragm 10 which forms the other electrode of the capacitive type transducer shown, with the spacing between the surface 34 and the diaphragm 10 being determined by the shims 36. The shims and the diaphragm may typically be fixed to the ring 28 by welding.

As will be seen from FIG. 3, the two pressures whose differential is to be measured are introduced to the transducer by way of tubes 40 and 42, which may also be of stainless steel.

In the design of FIG. 3, it is necessary to apply the higher pressure whose differential is being measured to the port defined by tube 40. Other designs could incorporate seals on both sides of the diaphragm so as to accept the higher pressure on either side.

Figure 4:
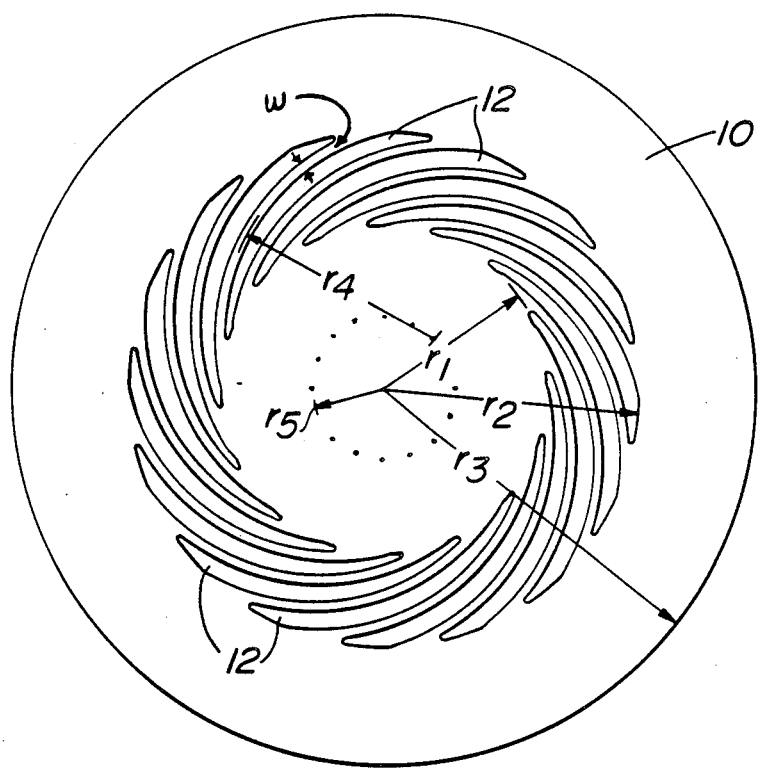
FIG. 4 is a plan view of a preferred form of the diaphragm of FIG. 1 showing construction details.

In FIG. 4 there is shown in detail the construction of one form of the diaphragm of this invention with the necessary construction details. Thus, $r_1$ is the diameter of the inner limits of the slots which form the perforations in FIG. 4, and $r_2$ is the outer limit of those slots. The outer periphery of the diaphragm is shown as $r_3$, and a circle on which are located the centers for the arcs which define the boundaries of the slots is shown as having a radius of $r_5$, from the center of the diaphragm. The arcuate slot boundaries are scribed from appropriately spaced centers on that circle with a radius, shown as $r_4$, so as to produce diaphragm areas between the slots, shown as "w". Exemplary values for the above dimensions may be:

| | |
|---|---|
| $r_1 =$ | .225 in. |
| $r_2 =$ | .36 in. |
| $r_3 =$ | .52 in. |
| $r_4 =$ | .30 in. |
| $r_5 =$ | .10 in. |
| w = | .0125 in. |

As has been indicated previously the form of the diaphragm perforations may vary. For example, round holes could be used, or the diaphragm could be formed from an inner plate and an outer ring connected to each other by small wires welded at each end. Both of these arrangements would require a thin plastic cover to prevent leakage. It is, of course necessary in all cases for the diaphragm structure to have elasticity.

Some applications may require a filter to prevent excessive moisture from entering the transducer. A small porous metal filter, either in a cylindrical or disc form and having a porosity that will allow air to pass but not water, is desirable.

What is claimed is:

1. A diaphragm for a transducer for measuring pressure differences in a particular range comprising:
    a circular diaphragm of resilient material having slots arranged to reduce the modulus of resilience of said diaphragm, said slots being regularly spaced convolutes extending from an outer diameter slightly less than the diameter of said diaphragm to an inner diameter defining a central area which has no slots and which can form a plate for a capacitive type pressure transducer; and
    a slack sealing cover placed over said slots, said sealing cover being of material of sufficient strength to prevent extrusion or bunching of said material into said slots upon application of a pressure difference in said range to said diaphragm and of sufficient flexibility to follow deflections of the diaphragm without significant resistance.

2. A diaphragm for a transducer for measuring pressure differences in a particular range comprising:
    a circular diaphragm of resilient material having slots arranged to reduce the modulus of resilience of said diaphragm, said slots extending only part way through the diaphragm material; and
    a slack sealing cover placed over said slots, said sealing cover being of material of sufficient strength to prevent extrusion or bunching of said material into said slots upon application of a pressure difference in said range to said diaphragm and of sufficient flexibility to follow deflections of the diaphragm without significant resistance.

3. A pressure transducer diaphragm comprising:
    a piece of thin metal having a plurality of etched slots extending completely through said metal and positioned at regularly spaced intervals about a center portion of the diaphragm and extending along convolutes out to a diameter slightly less than the diameter of the deflecting portion of the diaphragm so as to give greater flexibility in a small diameter diaphragm with a twist of the center portion accompanying the deflection of the diaphragm; and
    a plastic covering laid over said slots to cut off the leakage paths through the slots.

4. A diaphragm as set forth in claim 3 in which:
    the pressure measurement made by the transducer is a function of the rotation of the center portion of the diaphragm as it deflects in response to a pressure difference.

* * * * *